Dec. 12, 1933.     C. W. HANSELL     1,938,657
DETECTION OF FREQUENCY MODULATED SIGNALS
Filed Feb. 1, 1929
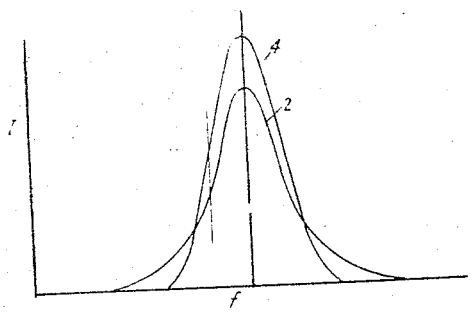
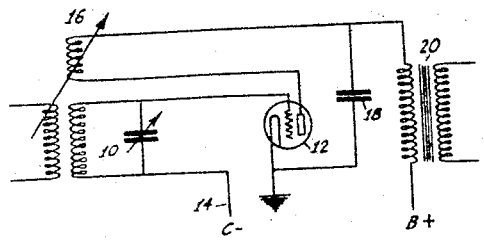
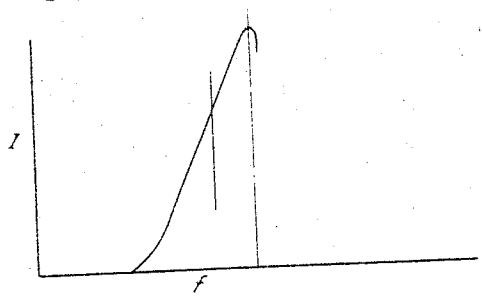
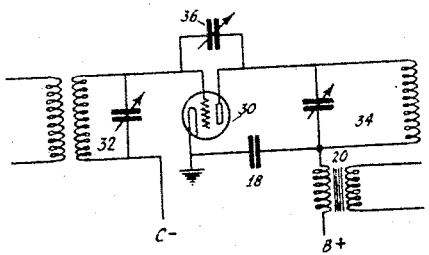
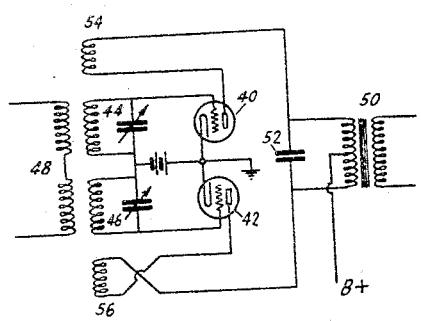
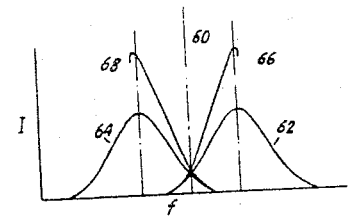
Inventor
CLARENCE W. HANSELL
By his Attorney Patented Dec. 12, 1933

1,938,657

UNITED STATES PATENT OFFICE 1,938,657

DETECTION OF FREQUENCY MODULATED SIGNALS

Clarence W. Hansell, Port Jefferson, N. Y., assignor to Radio Corporation of America, a corporation of Delaware Application February 1, 1929. Serial No. 336,771

3 Claims. (Cl. 250—27)

This invention relates to the detection of frequency modulated signals, and more particularly to detectors therefor employing a detuned resonant circuit for changing the frequency modulation to amplitude modulation before detection.

In order to detect frequency modulated signals at a receiver it has heretofore been proposed to analyze the received energy by applying it to a resonant circuit tuned to a frequency lying outside the working range of frequency, so that it responds unequally to the different frequencies in the working frequency range, thereby changing the frequency modulation to amplitude modulation, and thereafter to detect the analyzed or amplitude modulated energy. To obtain linear response the side of the resonance curve of the analyzing circuit being worked with should be straight over a considerable portion of its length, which ordinarily is not the case. The primary object of my invention is to straighten a portion of the sides of the resonance curve of the analyzing circuit of a frequency modulation detector.

The degree of amplitude modulation obtained from a given range of frequency modulation depends upon the steepness of the slope of the side of the resonance curve of the analyzing circuit, and a secondary object of my invention is to steepen this slope. Both of these objects I fulfill by regeneratively coupling the input and output circuits of the detector with respect to radio-frequency energy.

A further object of my invention is to obtain perfectly symmetrical operation, which is difficult with a single analyzing circuit, owing to slight differences in the portions of the resonance curve above and below the mean frequency. In such case I propose to employ a symmetrical circuit arrangement having two analyzing circuits, one tuned to a frequency lying to one side of the working range of frequency, to which is coupled one detector tube, and another analyzing circuit tuned to a frequency lying on the other side of the working range of frequency, to which is coupled a second detector tube, the circuits being tuned to have overlapping resonance curves intersecting at the mean frequency of the working range of frequency. The anode current of one of the tubes is strengthened while that of the other is weakened, as the received frequency varies toward the resonant frequency of one or the other of the two analyzing circuits. The output circuits of the detector tubes are coupled in series with a suitable translating device, which then is responsive to the differential of the anode currents. In accordance with my invention the output and input circuits of the detector tubes are regeneratively coupled, so that the overlapping resonance curves are straightened and steepened.

My invention is further described in the following specification, which is accompanied by a drawing in which Figure 1 is a comparison of resonance curves obtained with and without regeneration; Figure 2 is explanatory of a feature of my invention; Figure 3 is a wiring diagram for a form of my invention employing inductive feed back; Figure 4 is a modification using capacitive feed back; Figure 5 shows my invention applied to a symmetrical detector circuit; and Figure 6 is a resonance curve of the arrangement shown in Figure 5.

In Figure 1 there is shown a resonance curve, numbered 2, for a simple tuned analyzing circuit, from which it will be seen that it is difficult to select the straight portion necessary to obtain distortionless detection. By applying regeneration to the detector circuit the characteristic curve may be made like that numbered 4, which obviously, presents straighter and steeper sides, so that distortion may be reduced, and at the same time sensitivity may be increased. These curves presuppose that the tuning of the circuit is varied to maintain resonance.

In actual operation the tuning of the resonant circuit is kept constant, while the applied frequency varies. For frequencies below the resonant frequency the tuned circuit is an effective inductance, while for frequencies above resonance, the tuned circuit is an effective capacitance. This represents a change in phase, so that for a given feed back connection there can be regeneration only on one side of the resonance curve, and not on the other. This tends to tilt the resonance curve, as is indicated in Figure 2, and it will be seen that the resulting curve is a great improvement, for it is larger and easier to work with, and an operating portion of sufficient size may readily be selected on its sloping side.

A simple circuit embodying my invention is shown in Figure 3, in which there is an analyzing circuit 10, coupled between the control electrode and cathode of an electron emission tube 12. The tube is biased by a source connected to the lead 14 to give it rectifying properties. The anode circuit of the tube includes a feed back or tickler coil 16, in order to obtain the desired regeneration. A condenser 18 is provided to by pass the radiofrequency component of the rectified energy, while the signal frequency component flows through a transformer 20, and is fed to a suitable translating device. The resonant circuit 10 is tuned to a frequency lying outside the working range of frequency.

Figure 4 is different from the arrangement shown in Figure 3 in that the detector tube 30 is provided with a resonant input circuit 32 and a resonant output circuit 34, while the regenerative feed back is provided through a condenser 36 connected between the input and output resonant circuits. The signal frequency component of the anode energy, as before, is coupled through a transformer 20, to a suitable translating device, while the radiofrequency component is by passed through a condenser 18.

A symmetrical circuit detector is shown in Figure 5, in which there are a pair of detector tubes 40 and 42, to the input circuits of which are coupled resonant circuits 44 and 46, respectively. One of these is tuned to a frequency lying outside one extreme of the working frequency range, and the other is tuned to a frequency lying outside the other extreme of the working frequency range, so that they respond unequally to variations in the received frequency applied thereto by a circuit 48. The anodes of the tubes are connected in series with a transformer 50, so that the differential of the anode current is applied to the translating device. The direct anode current is fed to the center of the primary of the transformer, as shown, and the transformer is by passed, with respect to the radiofrequency component of the detected energy, by a condenser 52. In accordance with my invention the input and output circuits of detectors 40 and 42 are regeneratively coupled, the coupling being obtained, in this instance, by feed back coils 54 and 56. These are coupled in proper sense to obtain regeneration in each case, allowing for the fact that one of the tuned circuits is an effective inductance while the other is an effective capacitance.

Referring to Figure 6 it will be seen that with a mean operating frequency at the point indicated by the line 60, the resonance curves, without the regeneration, are as indicated by the curves 62 and 64, whereas with regeneration the resonance curves are as indicated by the curves 66, 68. In either case the use of the symmetrical circuit shown in Figure 5 permits of obtaining a symmetrical combined characteristic, but with the regeneration the symmetrical characteristic obtained may be made more nearly a straight line over a greater operating range of frequency.

I claim:

1. The method of straightening the sides of the resonance curve of the analyzing circuit tuned to a frequency at one side of the main frequency of the desired frequency modulated waves, of a frequency modulation detector in order to obtain linear response which includes the step of regeneratively coupling the input and output circuits of the detector with respect to the radiofrequency energy.

2. The combination with a frequency modulation detector comprising an analyzing circuit tuned to a frequency at one side of the main frequency of the desired frequency modulated waves, and a detector of means to regeneratively couple the input and output circuits of the detector with respect to radiofrequency energy in order to straighten the resonance curve of the analyzing circuit.

3. A frequency modulation detector circuit comprising a pair of electron emission tubes, a resonant analyzing circuit tuned to a frequency lying to one side of the working range of frequency coupled to the input circuit of one of the tubes, a resonant analyzing circuit tuned to a frequency lying to the other side of the working range of frequency coupled to the input circuit of the other of the tubes, said circuits having overlapping resonance curves, an output circuit coupled in series with the anodes of the tubes, and means for regeneratively coupling the anode circuits of each of the tubes with their respective input circuits in order to straighten the intersecting sides of the resonance curves of the analyzing circuits.

CLARENCE W. HANSELL.